(12) United States Patent
Tsujiguchi

(10) Patent No.: US 10,423,477 B2
(45) Date of Patent: Sep. 24, 2019

(54) CONTROL APPARATUS AND CONTROL METHOD FOR PROCESSOR INITIALIZATION

(71) Applicant: CANON KABUSHIKI KAISHA, Tokyo (JP)

(72) Inventor: Hiroko Tsujiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 15/611,632

(22) Filed: Jun. 1, 2017

(65) Prior Publication Data

US 2017/0351564 A1 Dec. 7, 2017

(30) Foreign Application Priority Data

Jun. 6, 2016 (JP) .................................. 2016-112730

(51) Int. Cl.
*G06F 11/00* (2006.01)
*G06F 11/07* (2006.01)

(52) U.S. Cl.
CPC ...... *G06F 11/0757* (2013.01); *G06F 11/0706* (2013.01); *G06F 11/0721* (2013.01); *G06F 11/0751* (2013.01)

(58) Field of Classification Search
CPC ............. G06F 11/0757; G06F 11/0721; G06F 11/0706; G06F 11/0751
See application file for complete search history.

(56) References Cited

U.S. PATENT DOCUMENTS

| 7,017,038 | B1 * | 3/2006 | Lachance | G06F 9/4403 713/2 |
| 2003/0052180 | A1 * | 3/2003 | Huhn | G05B 19/042 236/49.3 |
| 2005/0038924 | A1 * | 2/2005 | Takahashi | G06F 1/24 710/5 |
| 2006/0024116 | A1 * | 2/2006 | King | B41J 2/04541 400/624 |

FOREIGN PATENT DOCUMENTS

JP 6-214831 A 8/1994

* cited by examiner

*Primary Examiner* — Charles Ehne
(74) *Attorney, Agent, or Firm* — Canon U.S.A., Inc. IP Division

(57) ABSTRACT

A control apparatus connected to a device includes a first control unit configured to execute a program, a second control unit configured to access the device to control the device, and a third control unit configured to control a reset of the control apparatus by transmitting a watchdog reset signal to the first and the second control units. When a condition for triggering a watchdog reset is satisfied, the third control unit transmits a watchdog reset prior notification to the second control unit before transmitting the watchdog reset signal. Upon reception of the watchdog reset signal, the first control unit executes a watchdog reset on the control apparatus. When a watchdog reset is executed, the second control unit controls the device to perform processing for making the device ready to accept a command based on information acquired upon reception of the watchdog reset prior notification.

17 Claims, 8 Drawing Sheets

CONTROL APPARATUS AND CONTROL METHOD FOR PROCESSOR INITIALIZATION

BACKGROUND OF THE INVENTION

Field of the Invention

One disclosed aspect of the embodiments relates to a control apparatus having a central processing unit (CPU) to be initialized and a method for controlling the control apparatus.

Description of the Related Art

Conventionally, in a known information processing apparatus, an entire system including a CPU is initialized if an error occurs in the CPU and a watchdog reset is triggered. In this case, if an external device is connected to the information processing apparatus, the external device needs to be initialized in synchronization with the initialization of the entire system. Methods for initializing the external device include a method of performing initialization through incorporation of a sequence for initializing the connected external device in the operation of initializing the entire system and a method of performing initialization through an enabled reset terminal of the external device. As a method for performing initialization without using commands from the CPU, Japanese Patent Application Laid-Open No. 6-214831 discusses a method of latching a watchdog reset signal by using a failure detection apparatus, generating an input/output (I/O) reset signal for an external device, and resetting the external device.

SUMMARY OF THE INVENTION

Although a program required to initialize a CPU is stored in the memory of an external device, the memory also needs to be initialized in synchronization with the system initialization. If the memory is not initialized, it is impossible for the CPU to access the external device, after turning ON power of an information processing apparatus, to recognize the status of the external device and change the access method by a controller. As a result, a memory access by the controller will fail. For example, when periodically rewriting data in a flash read only memory (ROM), the CPU deletes data in the target area of the memory and writes new data in the area. When deleting and writing data, a certain time period is required to operate electric charges in floating gates of semiconductor devices configuring the memory. During this time period, the memory is in the busy state and does not accept other commands. Also in the technique discussed in Japanese Patent Application Laid-Open No. 6-214831, a similar problem arises during operation of an initialization program.

When a watchdog reset occurs, if a target memory is in the busy state even when a program fetch after returning from the reset occurs, the memory cannot correctly return read data from an external device. More specifically, even if a memory controller transmits a read command and data synchronization clock to the memory in the busy state (during a write or erase operation), the memory neither receives the command nor performs an action for returning correct read data. Therefore, the data received by the memory controller does not include correct values. In the case of a serial ROM device, no error signal is used and therefore the validity of data is to be determined based on the contents of the data. Accordingly, there arises a problem that the CPU fails in initialization since the fetched data is not correct.

To solve the above-described problem, according to an aspect of the disclosure, a control apparatus connected to a device includes a first control unit configured to execute a program, a second control unit configured to access the device to control the device, and a third control unit configured to control a reset of the control apparatus by transmitting a watchdog reset signal to the first and the second control units. When a condition for triggering a watchdog reset is satisfied, the third control unit transmits a watchdog reset prior notification to the second control unit before transmitting the watchdog reset signal. Upon reception of the watchdog reset signal, the first control unit executes a watchdog reset on the control apparatus. When a watchdog reset is executed, the second control unit controls the device to perform processing for making the device ready to accept a command based on information acquired upon reception of the watchdog reset prior notification.

Further features of the disclosure will become apparent from the following description of exemplary embodiments with reference to the attached drawings.

DESCRIPTION OF THE EMBODIMENTS

An information processing apparatus according to a first exemplary embodiment will be described below with reference to FIG. 1. While an image processing apparatus is an example of an information processing apparatus, an example is not limited thereto and may be an information processing apparatus having a CPU which is initialized through a watchdog timer reset. Examples of image processing apparatuses include a printer, scanner, multifunction printer having printing and scanning functions, copying machine, and plotter.

Figure 1:
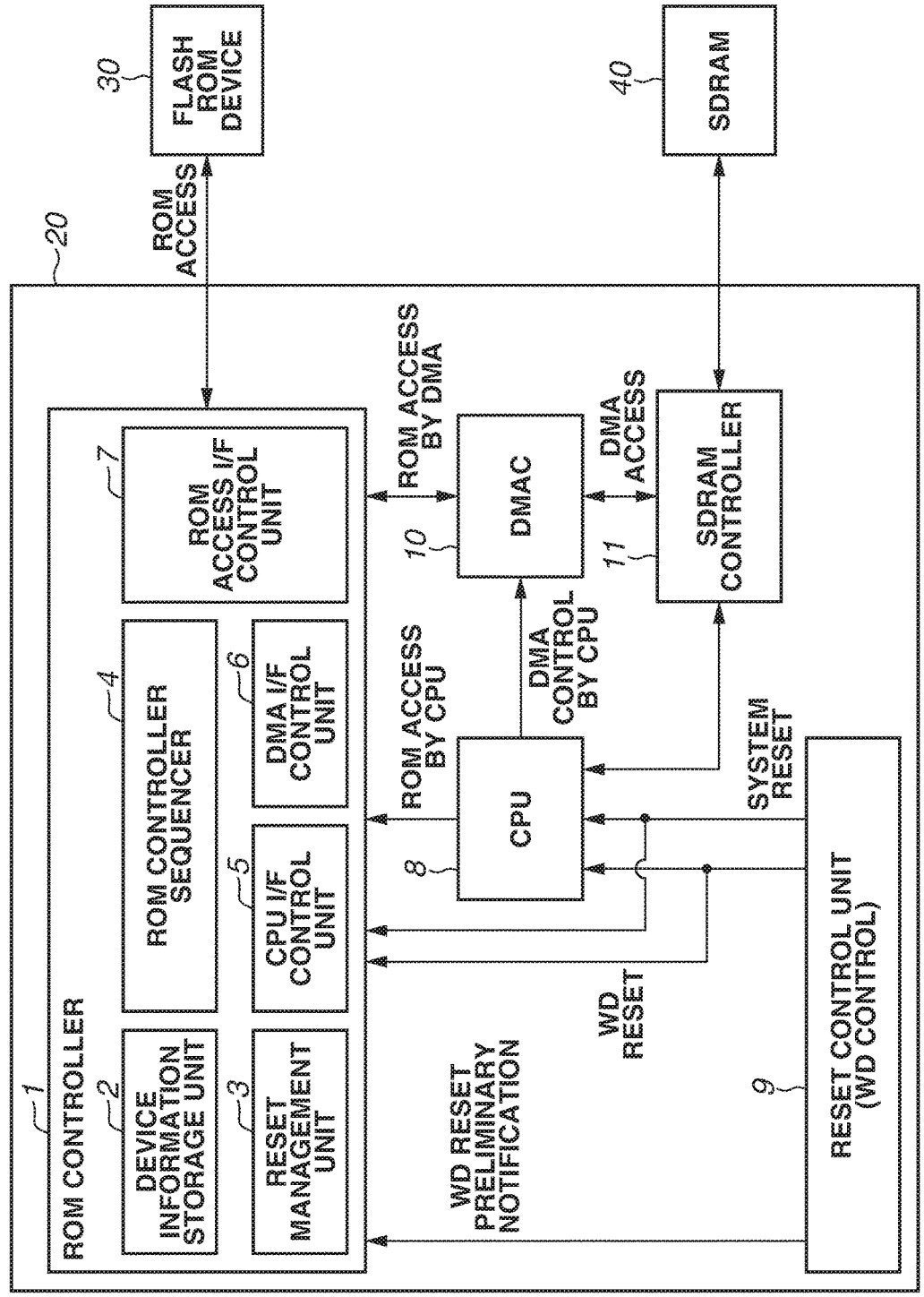
FIG. 1 illustrates a hardware configuration of an information processing apparatus according to a first exemplary embodiment.

FIG. 1 illustrates a hardware configuration of the information processing apparatus according to the present exemplary embodiment. The information processing apparatus includes an application specific integrated circuit (ASIC) 20, a flash ROM device 30, and a static random access memory (SDRAM) 40. According to the present exemplary embodiment, the ASIC 20 functions as a control apparatus for the flash ROM device 30. The ASIC 20 includes a ROM controller 1, a processor or a CPU 8, a reset control unit 9, a Direct Memory Access controller (DMAC) 10, and a SDRAM controller 11. The ROM controller 1 is connected with the flash ROM device 30 via a ROM interface signal line. The SDRAM controller 11 is connected with the SDRAM 40 via a RAM interface signal line.

The CPU 8 controls the entire information processing apparatus according to a program. For example, the CPU 8 controls DMA by the DMAC 10, controls the ROM controller 1, and controls an access to the SDRAM 40 by the SDRAM controller 11.

The reset control unit 9 controls a system reset when power is turned ON and performs watchdog (WD) control. More specifically, the reset control unit 9 inputs a system reset signal to the entire system of the ASIC 20 in a power-ON sequence. The power-ON sequence refers to a process of turning ON power of the information processing apparatus, i.e., turning ON a hardware power source. When a system reset is executed, the entire information processing apparatus is reset. When the reset control unit 9 executes a WD reset, the reset control unit 9 inputs a watchdog reset signal to the entire system in the information processing apparatus (in the ASIC 20). In this case, a device information storage unit 2 and a reset management unit 3 are not reset. If an error occurs in the CPU 8, the reset control unit 9 inputs a watchdog reset prior notification signal to the ROM controller 1 before inputting the watchdog reset signal (details will be described below). This enables the ROM controller 1 to perform control for a watchdog reset. A watchdog reset refers to initializing the system if an abnormal condition is determined through a watchdog timer. More specifically, in a state where a signal is periodically sent from the CPU 8, if a signal for clearing the timer is not sent from the CPU 8 when a predetermined time period (preset time period) has elapsed, the reset control unit 9 determines an abnormal condition and interrupts the CPU 8 to initialize the system. More specifically, when the condition for triggering a watchdog reset is satisfied, the reset control unit 9 transmits the watchdog reset signal to the CPU 8 and the ROM controller 1 to execute a watchdog reset.

The ROM controller 1 is a control unit of the externally connected flash ROM device 30. The ROM controller 1 includes a ROM access I/F control unit 7 connected with the flash ROM device 30, a DMA I/F unit 6 connected with the DMAC 10, a CPU I/F unit 5, the reset management unit 3, and the device information storage unit 2. The ROM controller 1 further includes a ROM controller sequencer 4.

The ROM access I/F control unit 7 is an interface for accessing the flash ROM device 30. The DMA I/F unit 6 is an interface for accessing the DMAC 10. The CPU I/F unit 5 transmits and receives program data to/from the CPU 8.

The reset management unit 3 receives various reset signals such as the system reset signal and the WD reset signal, and stores these pieces of information when a reset occurs. According to the present exemplary embodiment, upon reception of a watchdog reset occurrence notification (hereinafter referred to as a WD reset preliminary notification or WD reset prior notification), the reset management unit 3 stores a WD reset flag. When the WD reset is released, the reset management unit 3 deletes the WD reset flag.

The device information storage unit 2 stores information about modules connected to the ASIC 20. The information about the modules includes information about statuses of the connected modules, information of control history, and device identification information (e.g., a device identifier (ID)). According to the present exemplary embodiment, since the flash ROM device 30 is connected to the ASIC 20, the information of control history and the device ID of the flash ROM device 30 are stored in the device information storage unit 2 as information about the flash ROM device 30. The information of control history of the flash ROM device 30 is stored periodically, i.e., at predetermined cycles in the device information storage unit 2. The timing when the information of control history of the flash ROM device 30 is stored is not limited thereto. The information may be stored in the time interval from the time when the WD reset flag is stored in the reset management unit 3 to the time when a WD reset is executed. At the time of device initial setting in initialization operation, i.e., at the time of initial operation after a system reset in the power-ON sequence, the ROM access I/F control unit 7 acquires a directory of program specification blocks (PDIR) and stores this information as the device ID in the flash ROM device 30. The device information storage unit 2 stores information required for initialization synchronous control in a WD reset, and therefore is not initialized in a WD reset.

The DMAC 10 transmits and receives DMA transfer data according to a command of the CPU 8. More specifically, the DMAC 10 accesses the SDRAM controller 11 and transmits data from the flash ROM device 30 to the SDRAM 40.

The SDRAM controller 11 transmits and receives data according to a command of the CPU 8. More specifically, the SDRAM controller 11 accesses the SDRAM 40 and transmits data to the flash ROM device 30 via the DMAC 10.

The flash ROM device 30 is disposed outside the ASIC 20 and is connected with the ROM controller 1 in an accessible way.

The SDRAM 40 temporarily stores various information at the time of program execution by the CPU 8. Although, in the present exemplary embodiment, an SDRAM is used as an example of an external storage device, an example is not limited thereto and may be other external storage devices. The flash ROM device 30 stores programs to be executed by the CPU 8.

The ROM controller sequencer 4 controls operations of the entire ROM controller 1.

Although, in the present exemplary embodiment, the ASIC 20 is described as an example of a system which executes a watchdog reset, an example is not limited thereto and may be a field-programmable gate array (FPGA), processor, or central processing unit.

A watchdog reset will be described below. When power of the information processing apparatus is turned ON and the apparatus is activated, the CPU 8 executes a program fetch in the flash ROM device 30 storing a system activation program and copies data stored in the flash ROM device 30 to the SDRAM 40 in the system to load the data. After the program becomes executable in the SDRAM 40, the CPU 8 uses the flash ROM device 30 as a data storage area.

Figure 6:
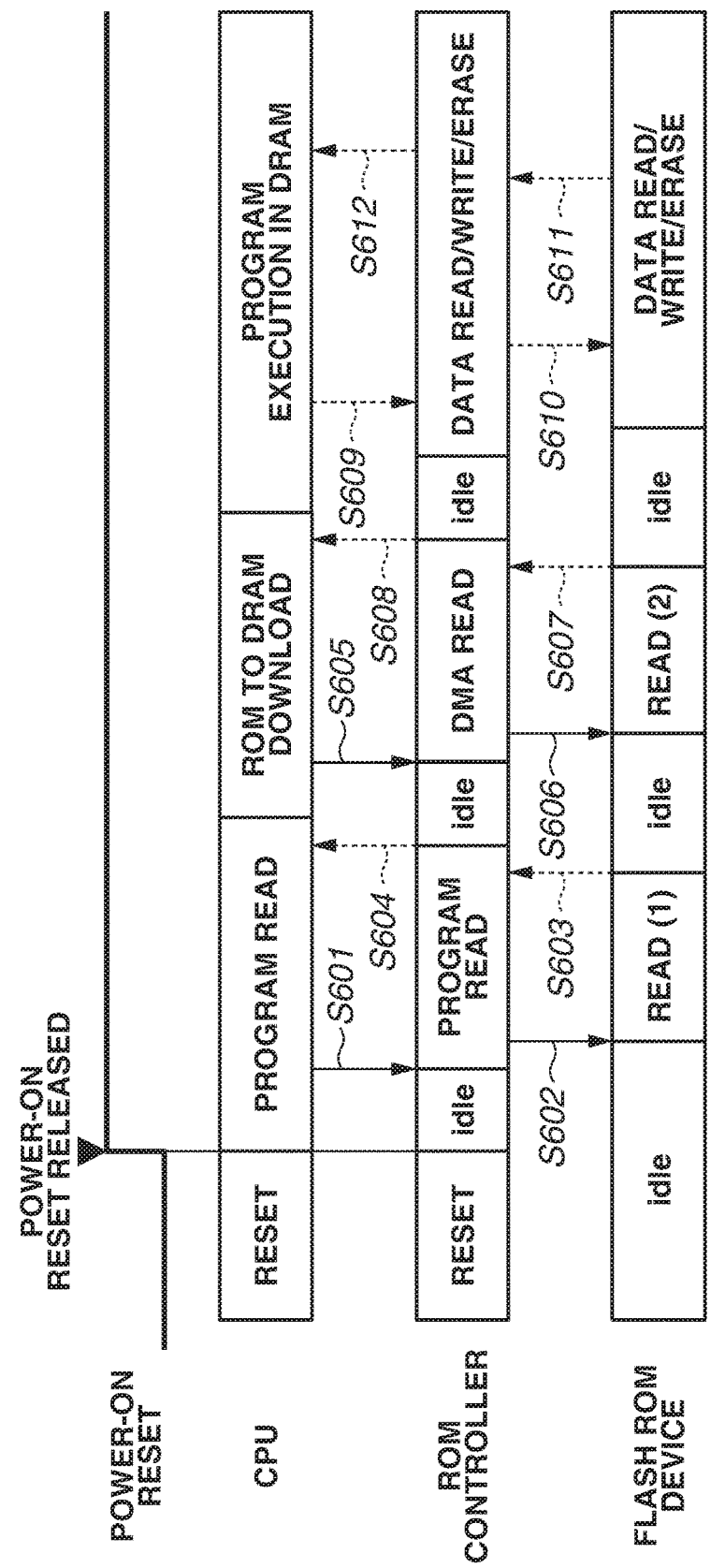
FIG. 6 illustrates a sequence in a power-ON reset according to the first exemplary embodiment.

FIG. 6 illustrates a power-ON reset sequence of the information processing apparatus.

In step S601, after the power-ON reset is released, the CPU 8 issues a program read command to the ROM controller 1 to execute a program fetch from the flash ROM device 30. In step S602, upon reception of the program read command, the ROM controller 1 issues a read command to the flash ROM device 30. In step S603, upon reception of the read command, the flash ROM device 30 transmits data to the ROM controller 1. In step S604, the ROM controller 1 transmits the data to the CPU 8. The initial operation refers to a process of making the program ready to be executed on the SDRAM 40.

In step S605, after completion of a program activation operation by the flash ROM device 30, the CPU 8 issues a DMA read command to the ROM controller 1 to transmit a system execution program from the flash ROM device 30 to the DMAC 10. In step S606, upon reception of the program read command, the ROM controller 1 issues a read command to the flash ROM device 30. In step S607, the flash ROM device 30 transmits data to the ROM controller 1. In step S608, the ROM controller 1 notifies the CPU 8 of completion of data transfer to the DMAC 10.

In steps S609 to S612, after the program becomes executable by the DMAC 10, the flash ROM device 30 is used as a data area and data is written in the flash ROM device 30.

Since the flash ROM device 30 is a flash memory, it is necessary to erase the target area before executing a write operation. After reception of a command and data related to an erase or write operation from the ROM controller 1, the flash ROM device 30 executes processing for erasing the target area.

Therefore, after transmitting a command, the ROM controller 1 accesses the status register in the flash ROM device 30 to check whether the flash ROM device 30 is in the BUSY state to detect the completion of a write or erase operation. More specifically, when the flash ROM device 30 is not in the BUSY state, the ROM controller 1 detects that a write or erase operation is completed.

Figure 7:
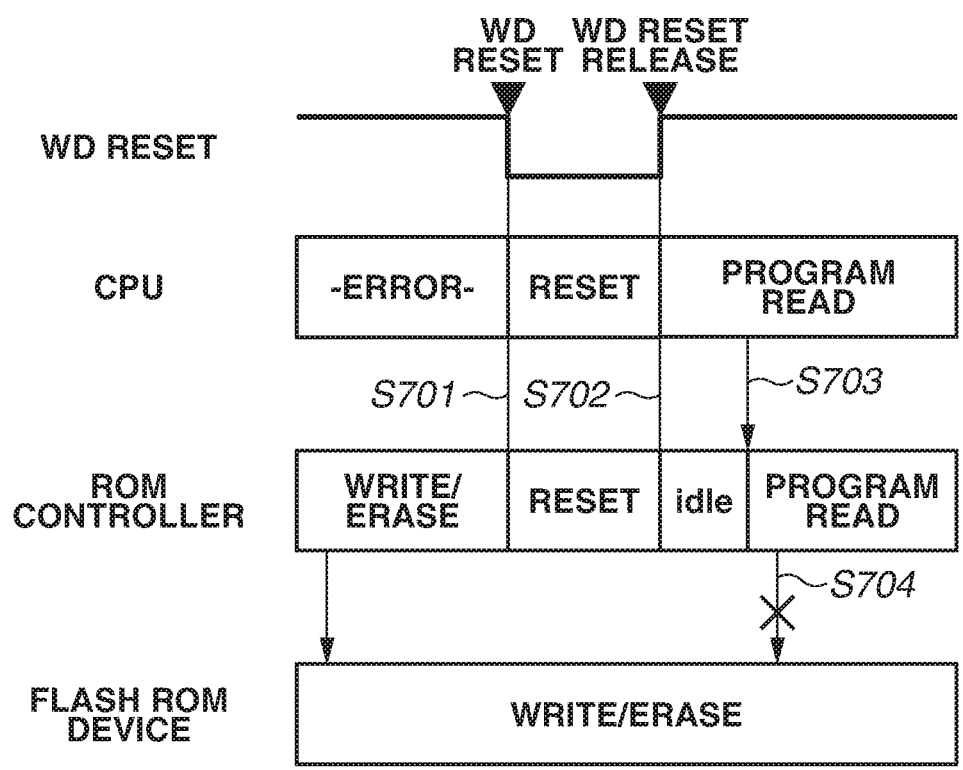
FIG. 7 illustrates a sequence in a conventional watchdog reset.

The sequence of a conventional watchdog reset will be described below with reference to FIG. 7. FIG. 7 illustrates the statuses of function blocks in a watchdog reset. If an error occurs in the CPU 8 and the apparatus becomes inoperative, a watchdog reset is triggered under watchdog control (WD control) by the reset control unit 9. In step S701, the reset control unit 9 transmits the WD reset signal not only to the CPU 8 but also to the ROM controller 1 to trigger a WD reset, thus initializing the entire system. In step S702, the watchdog reset is released, and the CPU 8 and the ROM controller 1 become initialized. When the watchdog reset is released, the CPU 8 executes a program fetch similar to a case where a power-ON reset is triggered. In step S703, the CPU 8 issues a program read command for fetch to the ROM controller 1. Although the CPU 8 and the ROM controller 1 have been initialized at this timing, the external flash ROM device 30 is not reset in a watchdog reset. More specifically, when the flash ROM device 30 is executing write or erase processing when a watchdog reset occurs, the internal operation of the flash ROM device 30 is continued. Therefore, the inside of the flash ROM device 30 may be in the BUSY state even after the watchdog reset is released. In step S704, even when the CPU 8 issues a program read command for fetch to the ROM controller 1 and the ROM controller 1 attempts to execute a read operation on the flash ROM device 30, the flash ROM device 30 is in the BUSY state and is unable to return normal data to the ROM controller 1. For this reason, the CPU 8 becomes unable to normally activate the system. On the other hand, in the present exemplary embodiment, if an error occurs in the CPU 8, the reset control unit 9 transmits a watchdog reset preliminary notification to the ROM controller 1 before inputting the WD reset signal. Upon reception of this notification, the ROM controller 1 stores the watchdog reset flag in the internal reset management unit 3. When the watchdog reset flag is stored in the reset management unit 3, the CPU 8 stores the information of device control history in the device information storage unit 2 as information for identifying the status in a watchdog reset. The information of the device control history refers to information about the command currently being executed by a module connected to the ASIC 20. According to the present exemplary embodiment, information for identifying the command currently being executed by the flash ROM device 30 is equivalent to the information of the device control history.

Subsequently, the reset control unit 9 inputs the WD reset signal to the ROM controller 1 and the CPU 8. In response to the WD reset signal, a watchdog reset is executed for the entire system. More specifically, the reset control unit 9 initializes the entire system. Then, the CPU 8 performs an initialization operation on the information processing apparatus and the information processing apparatus returns from a watchdog reset.

Figure 3:
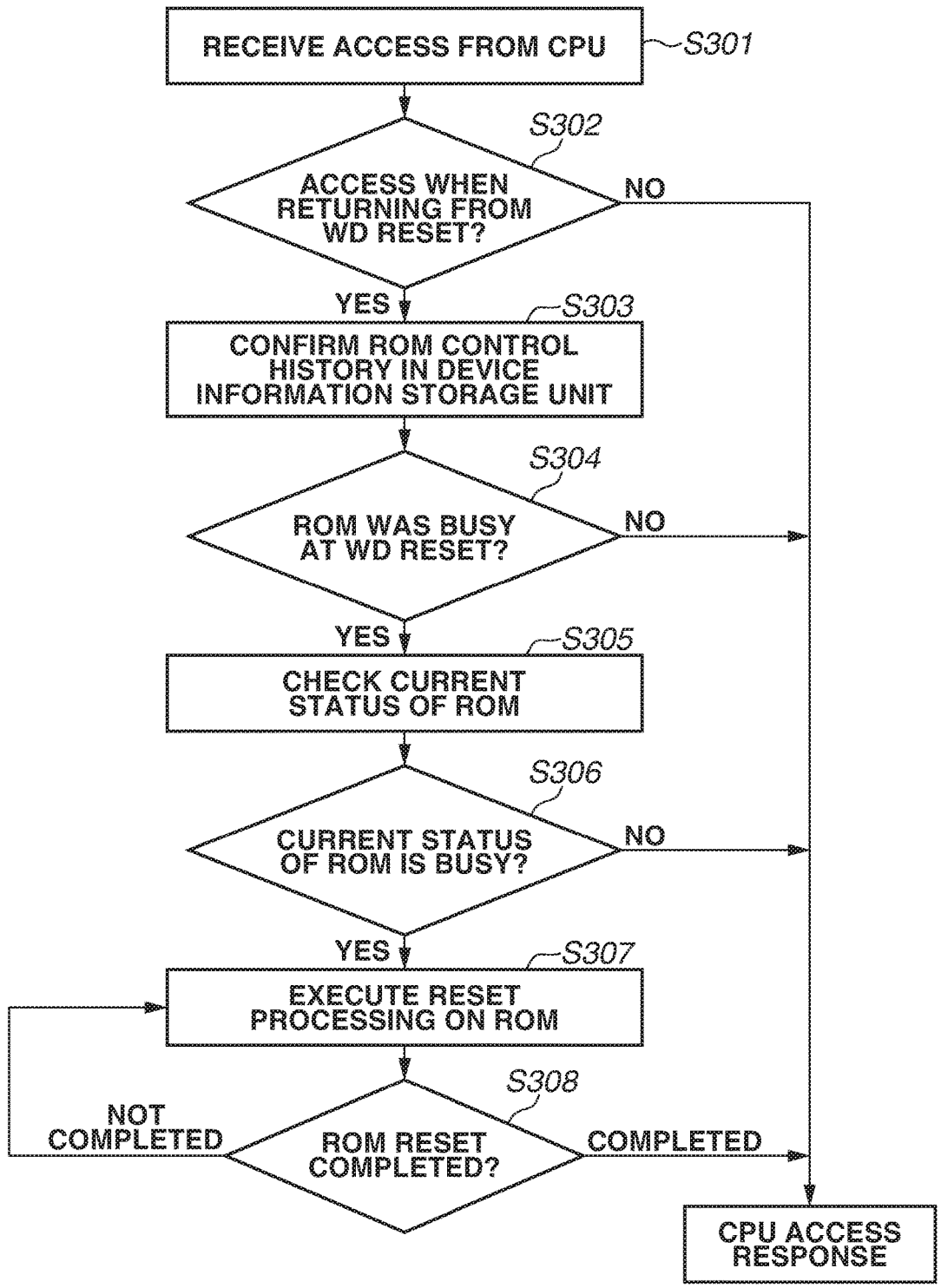
FIG. 3 is a flowchart illustrating a controller control flow after returning from the watchdog reset according to the first exemplary embodiment.

FIG. 3 is a flowchart illustrating processing of the ROM controller 1 after returning from a watchdog reset.

In step S301, the ROM controller 1 receives an access from the CPU 8. In step S302, the ROM controller 1 determines whether the received access is an access when returning from the WD reset. More specifically, the ROM controller sequencer 4 determines whether the received access is an access when returning from the WD reset according to whether the reset management unit 3 stored the WD reset flag as a history item of the WD reset signal reception. If the WD reset flag is set when the ROM controller 1 receives a read command from the CPU 8, the ROM controller 1 determines that the received access is an access when returning from the WD reset (YES in step S302), and the processing proceeds to step S303. On the other hand, if the reset management unit 3 did not store the WD reset signal (NO in step S302), the ROM controller 1 executes an access response to the CPU 8.

In step S303, the ROM controller sequencer 4 confirms ROM control history in the device information storage unit 2. More specifically, the ROM controller sequencer 4 acquires information about ROM access history from the device information storage unit 2. In step S304, when executing a WD reset, the ROM controller 1 determines whether the flash ROM device 30 was in the BUSY state. More specifically, based on the information stored in the device information storage unit 2, the ROM controller 1 determines whether the command executed in a watchdog reset is a command involving the BUSY state, such as a write or erase command. Based on the result of this determination, the ROM controller 1 determined whether the flash ROM device 30 was in the BUSY state.

If the last access immediately before a watchdog reset was a write or erase operation based on the information stored in the device information storage unit 2, the ROM controller 1 determines that the flash ROM device 30 was in the BUSY state in a WD reset (YES in step S304), and the processing proceeds to step S305. In step S305, the ROM controller 1 checks the current status of the flash ROM device 30. The ROM controller 1 reads the status register in the flash ROM device 30 to acquire information about the status of the flash ROM device 30. On the other hand, if neither a write nor erase operation was being executed when a WD reset occurred, the ROM controller 1 determines that the ROM was not in the BUSY state in a WD reset (NO in step S304) and executes an access response to the CPU 8.

In step S306, the ROM controller 1 determines whether the current status of the flash ROM device 30 is the BUSY state. When the ROM controller 1 reads the status register of the flash ROM device 30 and the BUSY flag is set, the ROM controller 1 determines that the flash ROM device 30 is in the BUSY state (YES in step S306), and the processing proceeds to step S307. On the other hand, when the ROM controller 1 reads the status register of the flash ROM device 30 and the BUSY flag is not set, the ROM controller 1 determines that the flash ROM device 30 is not in the BUSY state (NO in step S306) and executes an access response to the CPU 8.

In step S307, the ROM controller 1 issues a reset command to the flash ROM device 30 to execute reset processing on the flash ROM device 30. Thus, according to the present exemplary embodiment, the ROM controller 1 issues a reset command for reset processing without control by the CPU 8. In step S308, the ROM controller 1 determines whether the reset processing of the flash ROM device 30 is completed. When the ROM controller 1 reads the status register of the flash ROM device 30 and the BUSY flag is not set, the ROM controller 1 determines that the reset processing of the flash ROM device 30 is completed (COMPLETED in step S308) and executes an access response to the CPU 8.

Figure 2:
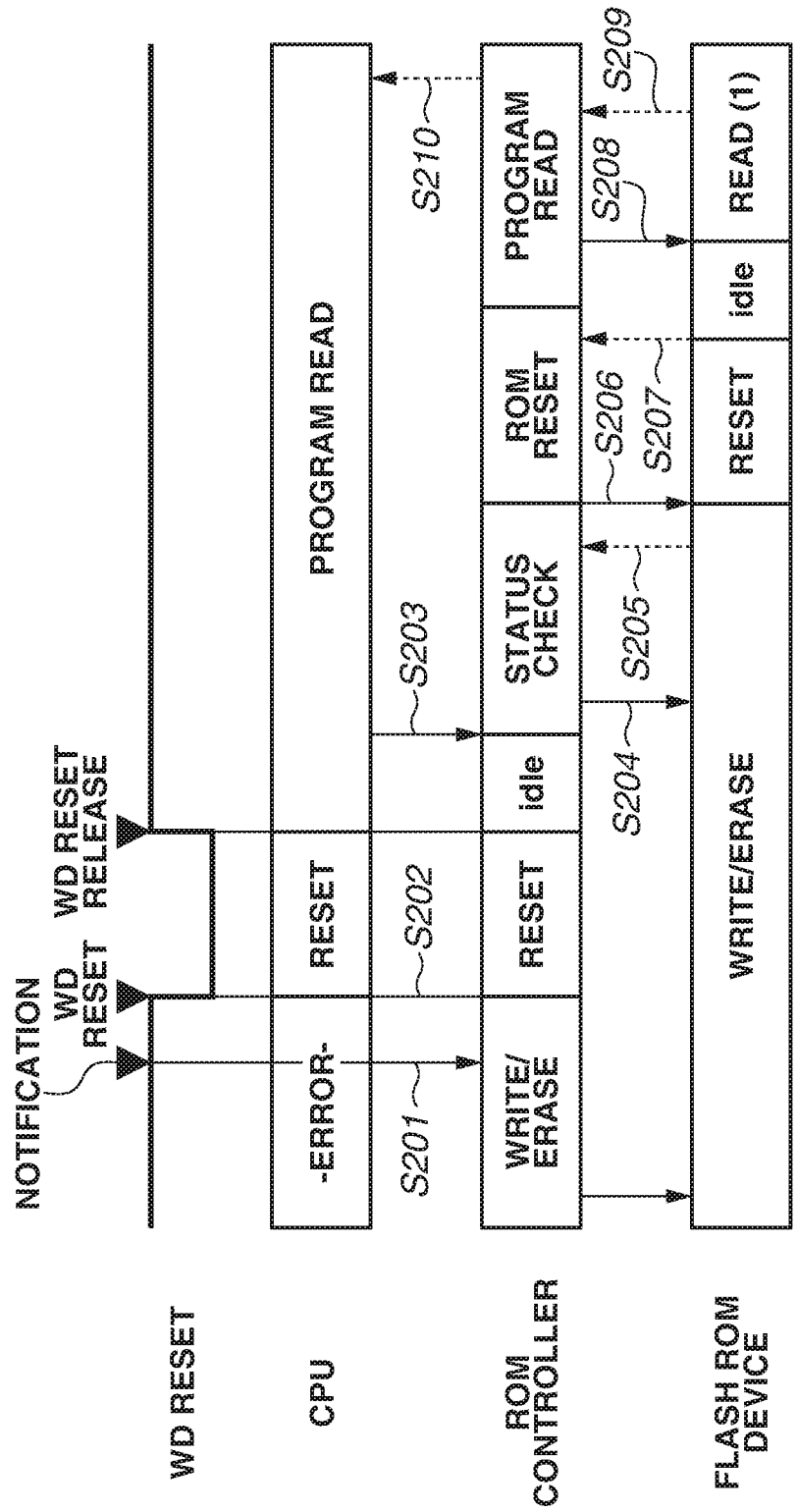
FIG. 2 illustrates statuses of function blocks and a sequence therebetween at the occurrence of a watchdog reset according to the first exemplary embodiment.

The statuses of function blocks and a sequence therebetween in a watchdog reset will be described below with reference to FIG. 2. FIG. 2 illustrates the statuses of function blocks in a watchdog reset.

If an error occurs in the CPU 8, the reset control unit 9 transmits the watchdog reset preliminary notification to the ROM controller 1 before inputting the WD reset signal to the ROM controller 1 and the CPU 8. In step S201, upon reception of this notification, the ROM controller 1 stores the WD reset flag in the internal reset management unit 3.

In step S202, the reset control unit 9 transmits the WD reset signal not only to the CPU 8 but also to the ROM controller 1 to trigger a WD reset, thus initializing the entire system. In step S203, the CPU 8 issues to the ROM controller 1 a read command (fetch command) to the flash ROM device 30. In step S204, the ROM controller 1 receives the fetch command and issues a command for reading the status register of the flash ROM device 30. In step S205, the ROM controller 1 reads the status register of the flash ROM device 30. After the watchdog reset is released, the CPU 8 and the ROM controller 1 are in the initial state (IDLE state) after a reset release. In step S206, after checking that the flash ROM device 30 is in the initial state, the ROM controller 1 issues a reset command to the flash ROM device 30. In step S207, the ROM controller 1 reads the completion of a reset operation of the flash ROM device 30. In step S208, upon completion of a reset operation of the flash ROM device 30, the ROM controller 1 becomes able to issue a read command and therefore issues the read command to the flash ROM device 30. In step S209, the ROM controller 1 receives read data from the flash ROM device 30. In step S210, the CPU 8 can acquire the read data.

In this way, upon reception a fetch command, the ROM controller 1 checks whether the reset management unit 3 has released a watchdog reset. After the watchdog reset is released, since the CPU 8 and the ROM controller 1 are in the initial state (IDLE state) after a reset release, the ROM controller 1 can execute a program fetch. If a watchdog reset is not triggered, i.e., if the received access is not an access when returning from the watchdog reset (NO in step S302 illustrated in FIG. 3), the ROM controller 1 determines that a power-ON reset is completed. In this case, since the flash ROM device 30 is also definitely in the IDLE state, the ROM controller 1 can execute a program fetch.

Upon reception of a watchdog reset notification, the ROM controller 1 stores information for identifying the command currently being executed by the flash ROM device 30 in the device information storage unit 2. In step S303, when executing a program fetch after releasing the watchdog reset, the ROM controller 1 acquires this information from the device information storage unit 2. When such a command involving the BUSY state of the flash ROM device 30 is not being executed in a watchdog reset, the ROM controller 1 determines that the flash ROM device 30 is not in the BUSY state in a WD reset (NO in step S304) and is able to execute a program fetch without checking the status register.

On the other hand, when a watchdog reset is triggered in a BUSY operation (YES in step S304), the processing proceeds to step S305. In step S305, the ROM controller 1 checks the status of the flash ROM device 30. When the status in the flash ROM device 30 is not BUSY (NO in step S306), the ROM controller 1 can execute a program fetch in step S205. On the other hand, when the status of the flash ROM device 30 is BUSY because write or erase processing is continued (YES in step S306), the processing proceeds to step S307. In step S307, the ROM controller 1 issues a reset command to the flash ROM device 30 to execute reset processing. Thus, the ROM controller 1 sets the flash ROM device 30 in the IDLE state and then is able to execute a program fetch in steps S206 to S207. According to the present exemplary embodiment, the ROM controller 1 includes the device information storage unit 2 which is not reset by a watchdog reset. Therefore, when the system is reset, the ROM controller 1 can initialize the flash ROM device 30 without receiving a command from the CPU 8. Therefore, it becomes possible to synchronize between the initializations of the system and the flash ROM device 30 allowing the system to be re-initialized without an error. More specifically, the device control information is stored in the device information storage unit 2 when a watchdog reset occurs, the ROM controller 1 can recognize the returning from a watchdog reset. Then, the ROM controller 1 determines whether the flash ROM device 30 in a watchdog reset is in the BUSY state. If the ROM controller 1 determines that the flash ROM device 30 is in the BUSY state, the ROM controller 1 checks the current status of the present flash ROM device 30. When the flash ROM device 30 is in the IDLE state (i.e., not in the BUSY state), the ROM controller 1 normally accesses the flash ROM device 30. When the current status of the flash ROM device 30 is the BUSY state, the ROM controller 1 transmits a reset command to the flash ROM device 30. Thus, the ROM controller 1 can execute reset processing only when the flash ROM device 30 needs to be reset, avoiding an error when executing a program fetch. As described above, the ROM controller 1 can execute reset processing of the external device (the flash ROM device 30 in the present exemplary embodiment) without intervention of the CPU 8, resulting in an effect that the initialization time can be reduced.

As described above, according to the present exemplary embodiment, the flash ROM device 30 as an externally connected device can be reset without intervention of the CPU 8. More specifically, when the CPU 8 executes an access to the flash ROM device 30 after a watchdog reset, the ROM controller sequencer 4 acquires control information at the time of a watchdog reset from the device information storage unit 2. Then, before the CPU 8 accesses the flash ROM device 30, the ROM controller 1 performs control for setting the flash ROM device 30 in the command inputtable state. In other words, the command inputtable state refers to a state where commands can be accepted from the outside.

This control enables avoiding a command input error in an access to the connected device after a watchdog reset.

The first exemplary embodiment has been described above centering on a sequence for initializing the flash ROM device 30 when executing a program fetch after a watchdog reset. On the other hand, according to a second exemplary embodiment, the ROM controller 1 initializes the flash ROM device 30 before a watchdog reset is triggered under the condition of the occurrence of a watchdog reset. According to the present exemplary embodiment, the hardware configuration is similar to that according to the first exemplary embodiment and redundant descriptions thereof will be omitted. Elements identical to those in the first exemplary embodiment are assigned the same reference numerals.

According to the second exemplary embodiment, if an error occurs in the CPU 8, the reset control unit 9 transmits a watchdog reset preliminary notification to the ROM controller 1 before inputting the WD reset signal.

Figure 5:
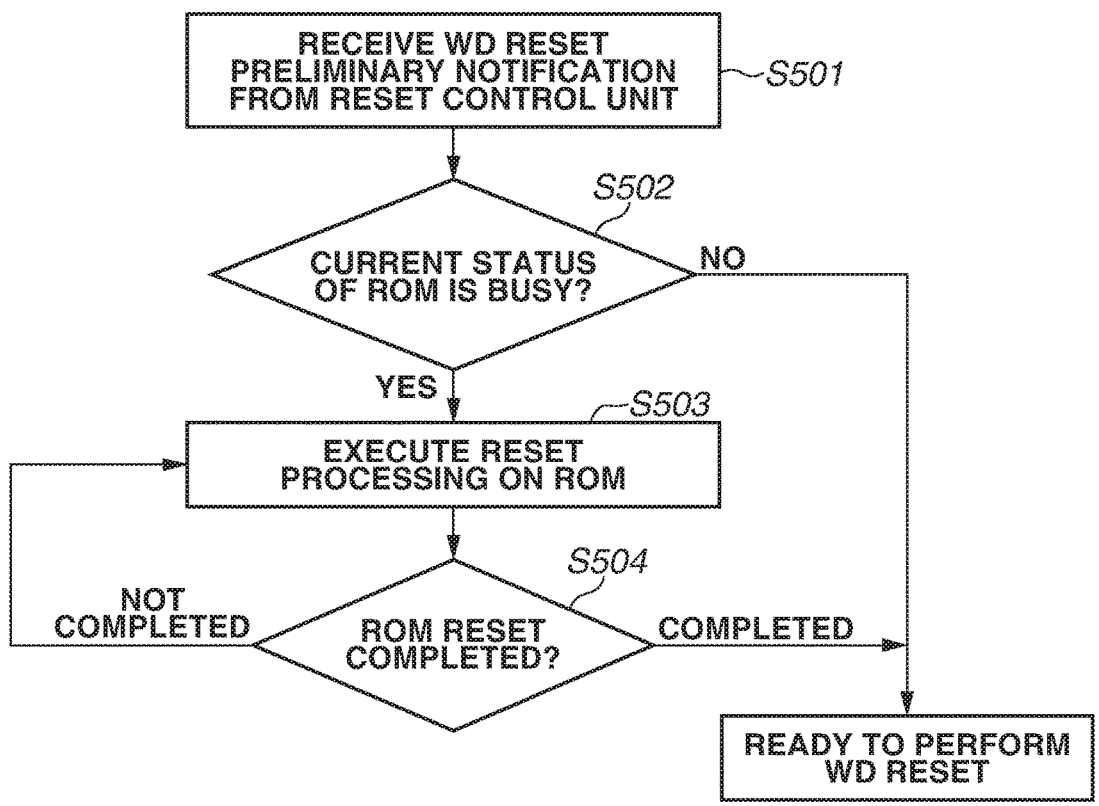
FIG. 5 is a flowchart illustrating a controller control flow at the occurrence of a watchdog reset according to the second exemplary embodiment.

FIG. 5 is a flowchart illustrating processing of the ROM controller 1 in a watchdog reset.

In step S501, the ROM controller 1 receives a watchdog reset preliminary notification from the reset control unit 9. In step S502, the ROM controller 1 determines whether the flash ROM device 30 is in the BUSY state. More specifically, the ROM controller 1 reads the status register of the flash ROM device 30 to acquire information about the status of the flash ROM device 30, checks the status of the flash ROM device 30, and determines whether the flash ROM device 30 is in the BUSY state. If the BUSY flag of the status register is set, the ROM controller 1 determines that the flash ROM device 30 is BUSY (YES in step S502), and the processing proceeds to step S503. On the other hand, if the BUSY flag of the status register is not set, the ROM controller 1 determines that the flash ROM device 30 is not in the BUSY state (NO in step S502) and ends the processing. In this case, the ASIC 20 becomes ready to execute a watchdog reset.

In step S503, the ROM controller 1 issues a reset command to the flash ROM device 30 to instruct the flash ROM device 30 to execute the reset processing. Thus, according to the present exemplary embodiment, the ROM controller 1 issues a reset command for the reset processing without control by the CPU 8. The reset processing refers to processing for initializing the flash ROM device 30 to set the flash ROM device 30 in the command inputtable state.

In step S504, the ROM controller 1 determine whether the reset processing of the flash ROM device 30 is completed. When the ROM controller 1 reads the status register of the flash ROM device 30 and the BUSY flag is not set, the ROM controller 1 determines that the reset processing of the flash ROM device 30 is completed (COMPLETED in step S504) and ends the processing. In this case, the ASIC 20 becomes ready to execute a watchdog reset.

Figure 4:
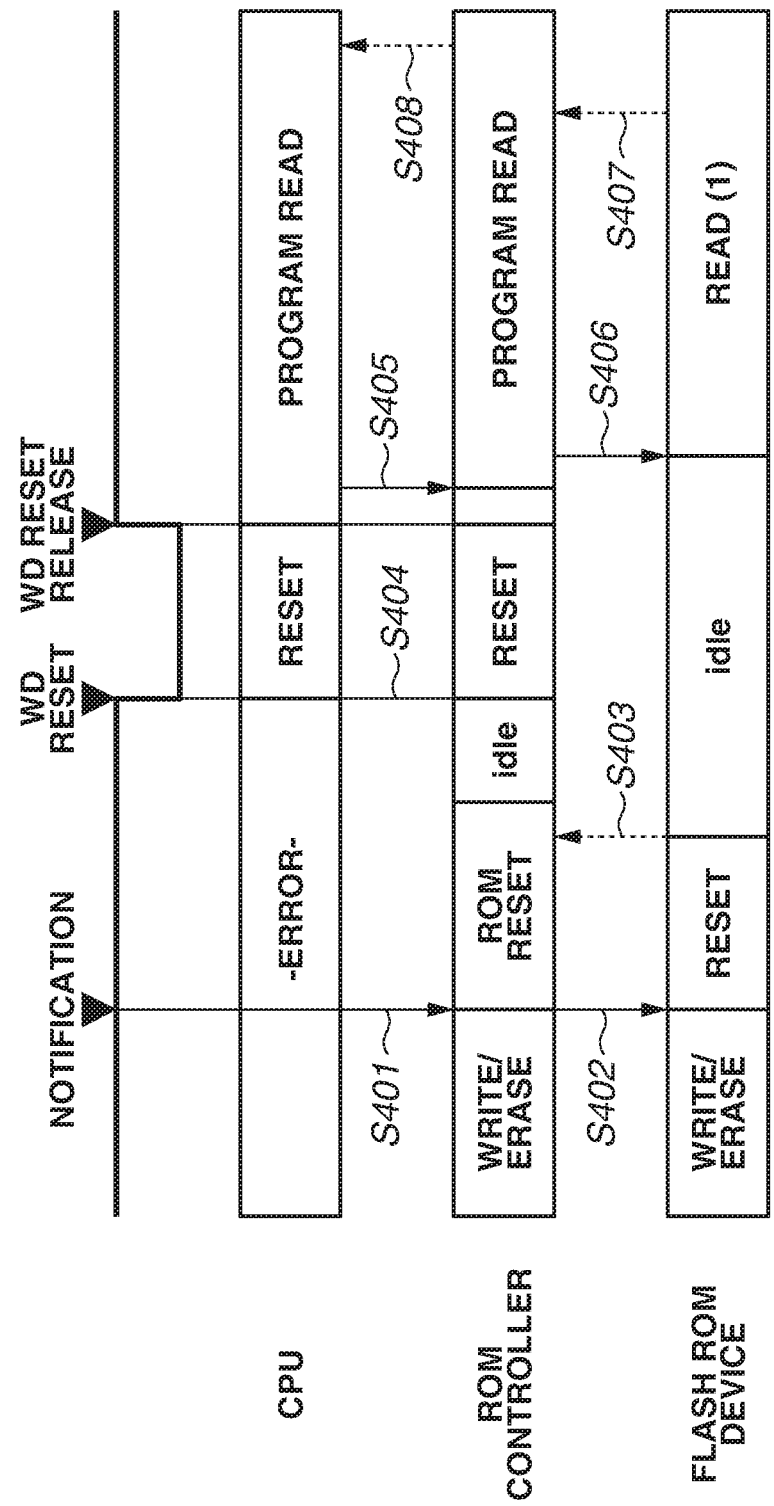
FIG. 4 illustrates statuses of function blocks and a sequence therebetween at the occurrence of a watchdog reset according to a second exemplary embodiment.

The statuses of function blocks and a sequence therebetween in a watchdog reset will be described below with reference to FIG. 4. FIG. 4 illustrates the statuses of function modules in a watchdog reset. FIG. 5 is a flowchart illustrating processing in a watchdog reset.

In step S401, if an error occurs in the CPU 8, the reset control unit 9 transmits a watchdog reset occurrence notification to the ROM controller 1 before issuing a watchdog reset command.

Upon reception of the watchdog reset occurrence notification, the ROM controller 1 checks the command status on the flash ROM device 30. In step S402, when the flash ROM device 30 is BUSY because of a write or erase operation, the ROM controller 1 issues a reset command to the flash ROM device 30. In step S403, the ROM controller 1 detects the completion of a watchdog reset.

In step S404, after waiting for a time period until the flash ROM device 30 is reset, the reset control unit 9 issues a watchdog reset to the entire system including the CPU 8. In step S405, the CPU 8 issues to the ROM controller 1 a read command (fetch command) to the flash ROM device 30. In step S405 to S408, the flash ROM device 30 is definitely in the IDLE state and therefore can execute a program fetch. In step S406, more specifically, the ROM controller 1 receives the fetch command and issues a read command to the flash ROM device 30. In step S407, the ROM controller 1 receives read data from the flash ROM device 30. In step S408, the CPU 8 can acquire the read data. According to the present exemplary embodiment, when the reset control unit 9 transmits a watchdog reset preliminary notification to the ROM controller 1 and then the ROM controller 1 receives the watchdog reset preliminary notification, the ROM controller 1 initializes the flash ROM device 30. Thus, when rebooting the system, it can be ensured that the flash ROM device 30 has already been initialized. Therefore, it becomes possible to synchronize between the initializations of the system and the flash ROM device 30 allowing the system to be re-initialized without an error.

Although the watchdog reset signal has been described as being issued by the reset control unit 9 after waiting until the flash ROM device 30 is reset, the timing of issuing the signal is not limited thereto. For example, the reset control unit 9 may issue the watchdog reset signal when the ROM controller 1 notifies the reset control unit 9 of the completion of a watchdog reset of the flash ROM device 30. When the CPU 8 executes a program read from the flash ROM device 30 through a program fetch after releasing the watchdog reset, the flash ROM device 30 can be definitely set in the IDLE state.

In this way, according to the present exemplary embodiment, when the ROM controller 1 receives the WD reset occurrence notification, the ROM controller 1 initialize the flash ROM device 30 based on the information about the status of the flash ROM device 30 before a WD reset is triggered.

Although, according to the present exemplary embodiment, the device information storage unit 2 is configured not to be initialized through a watchdog reset, it may be configured to be initialized through a watchdog reset.

A third exemplary embodiment will be described below centering on a case where the disclosure is applied to a printer.

Figure 8:
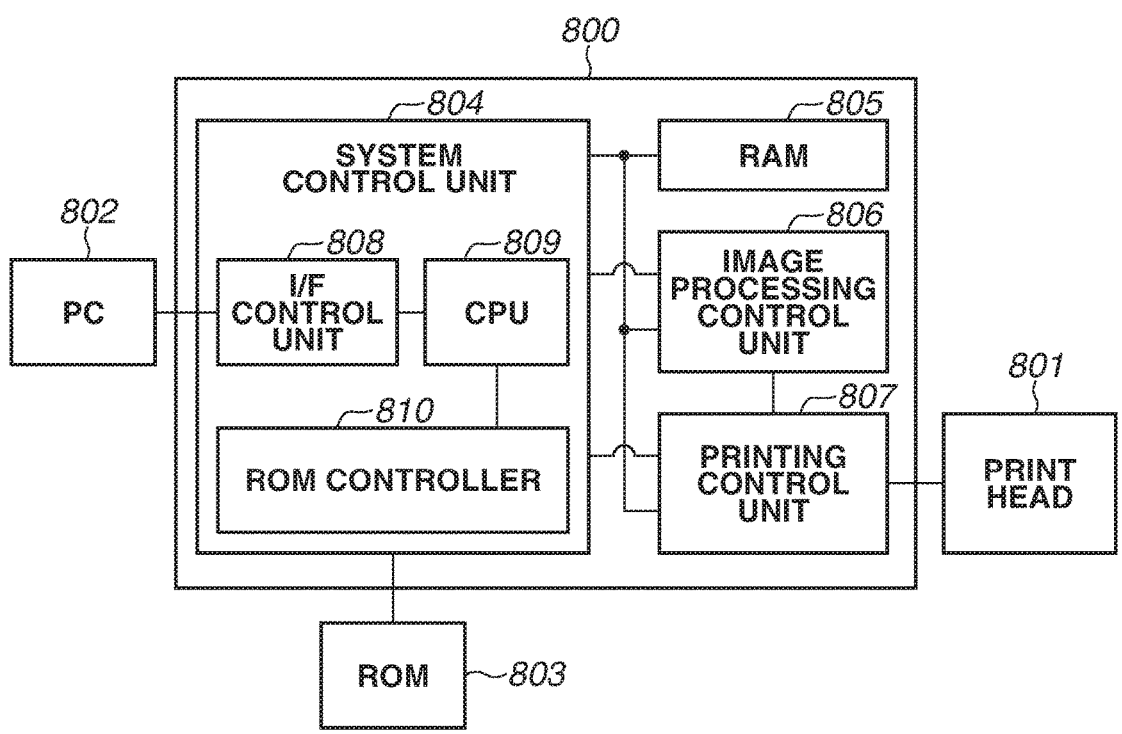
FIG. 8 illustrates a hardware configuration of an information processing apparatus according to a third exemplary embodiment.

FIG. 8 illustrates a hardware configuration of a printer according to the present exemplary embodiment.

The printer includes a printer controller 800, a print head 801, and a flash ROM device 803. The printer can be connected with an external host personal computer (PC) 802.

The flash ROM device 803 stores programs. The print head 801 performs printing based on print data.

The printer controller 800 includes a system control unit 804, a RAM 805, an image processing control unit 806, and a printing control unit 807. The RAM 805 is a RAM unit storing print data. The image processing control unit 806 generates print data based on image data. The printing control unit 807 transmits the print data to the print head 801.

The system control unit 804 includes an interface (IF) control unit 808, a CPU 809, and a ROM controller 810. The IF control unit 808 communicates with the host PC 802 in the system control unit 804. The CPU 809 controls the entire printer system. The ROM controller 810 controls the flash ROM device 803.

According to the present exemplary embodiment, the CPU 809, the ROM controller 810, and the flash ROM device 803 execute similar operations to the operations of the CPU 8, the ROM controller 1, and the flash ROM device 30, respectively, according to the first exemplary embodiment. Thus, according to the present exemplary embodiment, it is possible to read the flash ROM device 803 and then reboot the system without an error even if an unexpected error occurs during printer operation.

The configurations of the exemplary embodiments are not limited to the above-described ones. For example, the flash ROM device 30 is not limited to a storage device and may be other external devices requiring the synchronization of the initial state. More specifically, the flash ROM device 30 may be an external device which can be initialized from the outside through communication, such as an integrated circuit (IC) chip. While command control from the outside is an example of a method for initializing an external device from the outside through communication, an example is not limited thereto. Although, in the exemplary embodiments, the entire system including the CPU is initialized through a watchdog reset, the initialization method is not limited thereto. For example, the system may be initialized by an initialization method employing other failure detection methods. Further, general reset operations received from the outside of the system are also applicable. Example reset operations include a reset operation for halting the CPU 8 when a predetermined temperature is reached or exceeded and a reset operation using a software OFF button. In other words, the disclosure is applicable to a configuration in which the system including the CPU 8 is reset but a connected external device is not.

Although, in the above-described exemplary embodiments, a reset command is issued to the flash ROM device 30 when a watchdog reset occurs, the reset command is not limited thereto. More specifically, any command is applicable as long as it makes the flash ROM device 30 ready to accept a command from the outside. For example, a suspend command and other commands for initializing the status in the flash ROM device 30 are applicable.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the disclosure, a connected device can be reset without intervention of the CPU 8. This enables avoiding a command input error in an access to the device after a reset.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-112730, filed Jun. 6, 2016, which is hereby incorporated by reference herein in its entirety.

What is claimed is:

1. A control apparatus connected to a device, comprising:
a first controller configured to execute a program;
a second controller configured to access the device to control the device; and
a third controller configured to control a reset of the control apparatus by transmitting a watchdog reset signal to the first and the second controllers,
wherein, in a case where a condition for triggering a watchdog reset is satisfied, the third controller transmits a watchdog reset prior notification to the second controller before the third controller transmits the watchdog reset signal to the first and second controllers,
wherein, upon reception of the watchdog reset signal from the third controller, the first controller executes a watchdog reset on the control apparatus, and
wherein, in a case where a watchdog reset is executed, the second controller controls the device to perform processing for enabling the device to accept a command based on information acquired upon reception of the watchdog reset prior notification from the third controller.

2. The control apparatus according to claim 1,
wherein the second controller comprises an information storage unit configured to store information about a control history of the device,
wherein, upon reception of the watchdog reset prior notification, the second controller acquires the information about the control history of the device, and
wherein, after a watchdog reset is executed, the second controller controls the device to perform the processing based on the information about the control history of the device.

3. The control apparatus according to claim 2, wherein the information storage unit is not initialized even when a watchdog reset is executed.

4. The control apparatus according to claim 1,
wherein, upon reception of the watchdog reset prior notification, the second controller acquires information about a status of the device, and
wherein, before a watchdog reset is executed, the second controller controls the device to perform the processing based on the information about the status of the device.

5. The control apparatus according to claim 1, wherein the second controller issues a command to the device to control the device.

6. An information processing apparatus comprising:
the control apparatus according to claim 1; and
the device.

7. A printer comprising:
the control apparatus according to claim 1;
the device; and
a print head.

8. A control apparatus comprising:
a first controller configured to execute a program;
a second controller configured to access a storage device to read the program according to a command from the first controller and control the storage device; and
a third controller configured to transmit a reset signal to the first and the second controllers,
wherein the third controller transmits a watchdog reset prior notification to the second controller before the third controller transmits the reset signal,
wherein, upon reception of the prior notification from the third controller, the second controller determines a status of the storage device and controls a reset of the storage device according to a result of the determination, and
wherein, after a reset of the first and the second controllers based on the reset signal from the third controller and after a reset of the storage device, the program is read from the storage device.

9. The control apparatus according to claim 8, wherein, in a case where the prior notification is not received, the second controller does not determine the status of the storage device.

10. The control apparatus according to claim 8,
wherein the second controller comprises an information storage unit configured to store information about a control history of the storage device, and
wherein, upon reception of the prior notification, the second controller, after a reset of the first and the second controllers, determines the status of the storage device based on the information about the control history stored in the information storage unit, and controls a reset of the storage device according to a result of the determination.

11. The control apparatus according to claim 10, wherein the information storage unit is not initialized even when a reset of the second controller is executed.

12. The control apparatus according to claim 8, wherein the second controller performs:
acquiring information about a status of the storage device upon reception of the prior notification to determine the status of the storage device; and
controlling a reset of the storage device based on a result of the determination before a reset of the first and the second control units is executed.

13. The control apparatus according to claim 8, wherein the second controller issues a command to the storage device to control the storage device.

14. An information processing apparatus comprising:
the control apparatus according to claim 8; and
the storage device.

15. A printer comprising:
the control apparatus according to claim 8;
the storage device; and
a print head.

16. A method for controlling a control apparatus connected to a device, the control apparatus including a first controller configured to execute a program, a second controller configured to access the device to control the device, and a third controller configured to control a reset of the control apparatus by transmitting a watchdog reset signal to the first and the second control units, the method comprising:
causing, in a case where a condition for triggering a watchdog reset is satisfied, the third controller to transmit a watchdog reset prior notification to the second controller before the third controller transmits the watchdog reset signal;
causing, upon reception of the watchdog reset signal from the third controller, the first controller to execute a watchdog reset of the control apparatus; and
causing, in a case where a watchdog reset is executed, the second controller to control the device to perform processing for making the device ready to accept a command based on information acquired upon reception of the watchdog reset prior notification from the third controller.

17. A method for controlling a control apparatus connected to a storage device, the control apparatus including a first controller configured to execute a program, a second controller configured to access the storage device to read the program according to a command from the first controller and control the storage device, and a third controller configured to transmit a reset signal to the first and the second control units, the method comprising:
causing the third controller to transmit a reset prior notification to the second controller before the third controller transmits the reset signal;
causing, upon reception of the prior notification from the third controller, the second controller to determine a status of the storage device and control a reset of the storage device according to a result of the determination; and
reading the program from the storage device after a reset of the first and the second controllers based on the reset signal from the third controller and after a reset of the storage device.

* * * * *